Jan. 16, 1968     M. J. BUTLER ET AL     3,364,483

RECTANGULAR TO POLAR COORDINATE CONVERTER SYSTEM

Filed March 25, 1960

*INVENTORS,*
MATTHEW J. BUTLER
WERNER F. ZAAYENGA
ALVIN ZARIN

BY *Harry M. Saragovitz*
ATTORNEY

United States Patent Office 3,364,483
Patented Jan. 16, 1968

3,364,483
RECTANGULAR TO POLAR COORDINATE CONVERTER SYSTEM
Matthew J. Butler, Wall Township, Monmouth County, Werner F. Zaayenga, Freehold Township, Monmouth County, and Alvin Zarin, Asbury Park, N.J., assignors to the United States of America as represented by the Secretary of the Army
Filed Mar. 25, 1960, Ser. No. 17,713
5 Claims. (Cl. 343—7)

The invention described herein may be manufactured and used by or for the Government for governmental purposes, without the payment of any royalty thereon.

This invention relates to tracking radar systems and more particularly to a system for transforming rectangular coordinates into polar coordinate error signals whereby a tracking radar is driven to a target in space.

In the field of remote positioning systems it is frequently required that rectangular coordinates be transformed into polar coordinates in order to position equipment such as radars, jammers, weapon launchers, etc. In the past, whenever it was necessary to control a target track radar employing conventional track-while-scan techniques for the acquisition of targets, given an available source of X, Y, and H rectangular coordinate data, a separate electromechanical analog coordinate converter was employed. This type of converter in most instances, was designed to meet the specific application. Conversion accessories were such that the basic radar had to be substantially modified. For example, additional wider range gates and special detection circuits to achieve automatic lock-on were required, and the scanning area of the antenna had to be increased. Not only were such converters inadequate insofar as accuracy was concerned, but they were also physically large, difficult to maintain under field conditions and expensive.

It is an object of the present invention to provide a rectangular-to-polar coordinate sensor, hereinafter referred to as the RPCS, which can readily be utilized in conjunction with the target track radar analog computer and the target track radar servo system.

It is another object of the present invention to provide a rectangular-to-polar coordinate sensor which is simple in construction and easy to operate and maintain under field conditions.

In accordance with the present invention there is provided a local target track radar including a range servo loop, an elevation servo loop, and an azimuth servo loop, each provided with an output servo drive motor and including means respectively responsive to the output of the servo drive motors to produce three discrete D.C. voltages which correspond to the $X_L$, $Y_L$, and $H_L$ rectangular coordinates of a target in space with respect to the local target track radar. Also included is a radar source remote from the local target track radar and adapted to produce three discrete D.C. voltages which correspond to the $X_R$, $Y_R$, and $H_R$ rectangular coordinates of a target in space with respect to the radar remote source, the D.C. voltages being measured to the same scale. In addition, there are included discrete means for converting the differences between corresponding rectangular coordinates to respective $\Delta X$, $\Delta Y$, and $\Delta H$ A.C. error signals, and means for resolving the $\Delta X$ and $\Delta Y$ A.C. error signals to respective voltages corresponding to polar coordinates representing the range difference voltage $\Delta R$ and the azimuth difference voltage $\Delta \theta$ between the local and remote targets. The range difference voltage $\Delta R$ and the azimuth difference voltage $\Delta \theta$ are applied respectively to the range servo loop and the azimuth servo loop such that the outputs of the range and azimuth servo drive motors are driven in a direction to null the respective difference voltages applied thereto. Also included are means for applying the $\Delta H$ error signal to the elevation servo loop whereby the elevation servo loop drive motor is driven in a direction to null the $\Delta H$ error signal.

For a better understanding of the invention, together with other and further objects thereof, reference is had to the following description taken in connection with the accompanying drawings in which.

Figure 1:
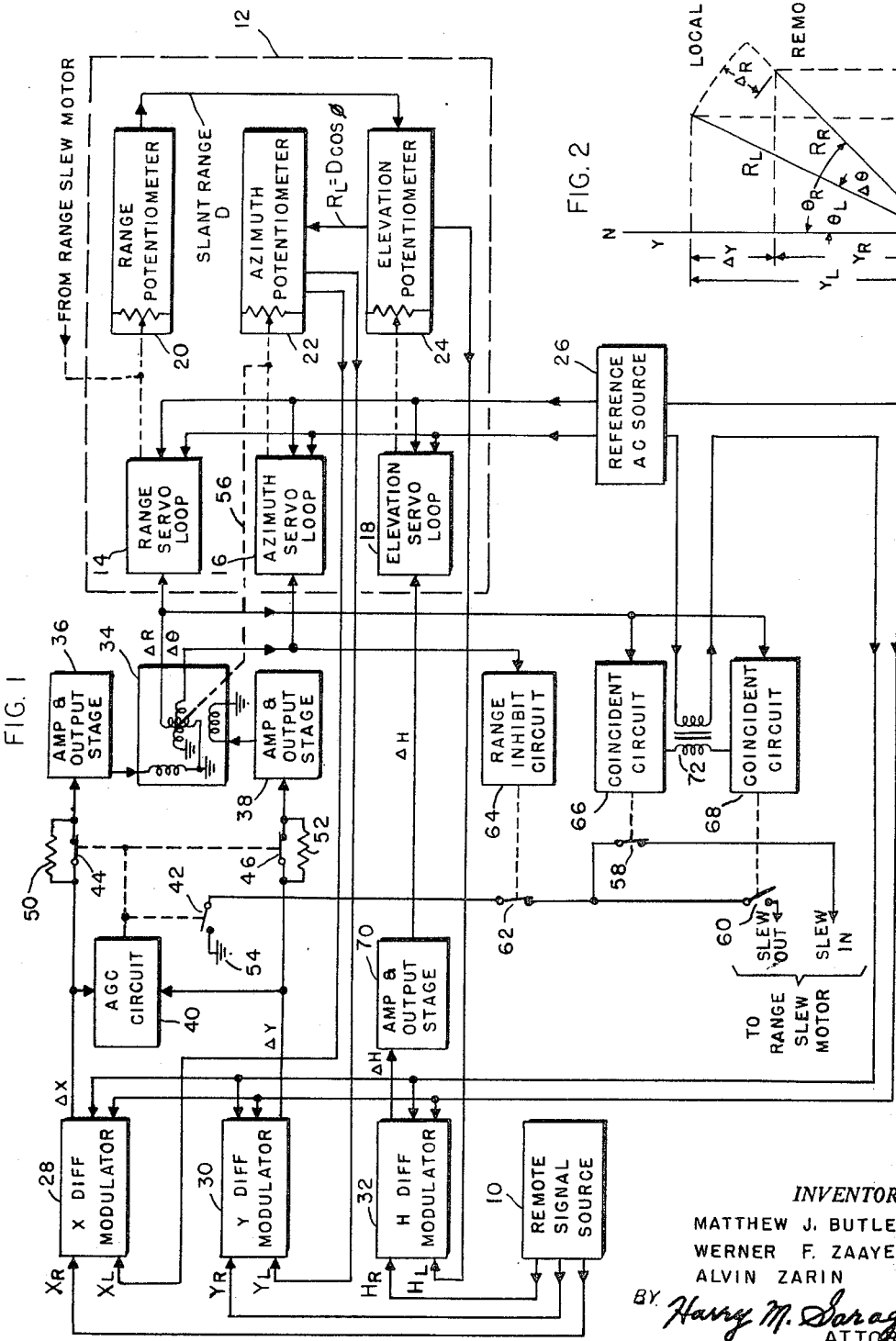
FIG. 1 is a block schematic diagram illustrating the present invention.

Referring now to FIG. 1 of the drawing, at 10 there is shown a remote source of rectangular coordinates $X_R$, $Y_R$, and $H_R$, which locates a specific target in space. The remote source may be any one of a network of radar controlled weapon batteries adapted to locate and destroy enemy aircraft. At 12 there are shown components of a target track radar from which there is derived rectangular coordinates $X_L$, $Y_L$, and $H_L$, to locate a target in space and which is hereinafter designated as the local source of rectangular coordinates. The target track radar components shown include a range servo loop 14, an azimuth servo loop 16, and an elevation servo loop 18, and also include a range potentiometer 20, a sine-cosine azimuth potentiometer 22, and a sine-cosine elevation potentiometer 24. Elements 14-24 are well known in the art and function in their normal mode of operation. It is to be understood that each servo loop includes a servo motor the output of which drives a respective wiper arm of its associated potentiometer, each of the servo motors outputs being represented by the dashed line shown between the respective servo loops and their associated potentiometer wiper arms. The wiper arm of range potentiometer 20 may be driven by either the drive motor output of the range servo loop 14 or by a conventional range slew motor (not shown). The D.C. voltage derived from range potentiometer 20 represents slant range D and is applied in the usual manner as the input to elevation sine-cosine potentiometer 24. The output of the drive motor of elevation servo loop 18 determines the position of the elevation potentiometer wiper arm from which there is derived a D.C. voltage representing the $H_L$ coordinate, i.e., $H_L = D \sin \phi$, where $\phi$ is the angle of elevation. A second D.C. voltage representing ground range $R_L$ is also derived from elevation potentiometer 24, i.e., $R_L = D \cos \phi$, and is fed to the azimuth potentiometer 22 as shown. The wiper arm of azimuth potentiometer 22 is controlled by the output of the drive motor of azimuth servo amplifier 16 so that the output of azimuth potentiometer 22 comprises two D.C. voltages representing coordinates $X_L$ and $Y_L$ equal respectively to $R_L \sin \theta$, and $R_L \cos \theta$, where $\theta$ is the azimuth angle position of the local radar antenna. The usual A.C. reference voltage for the servo systems is shown at 26. The operation of the components 14-24 at the target track radar is so well known that no detailed description thereof is believed necessary. When the local target track radar is on a specific target, the rectangular coordinates $X_L$, $Y_L$, and $H_L$, derived therefrom locate the local target in space. Although not limited thereto, the instant invention will be better understood when described in connection with the target track radar system hereinabove described. Before proceeding with the description below, it is to be understood that the remote source rectangular coordinates $X_R$, $Y_R$, and $H_R$, and the local or target track radar source rectangular coordinates $X_L$, $Y_L$, and $H_L$, are D.C. voltages with identical scale factors. It is also to be understood that the parallax between the remote and local sources is corrected in the usual manner by the data transmission equipment at both radar locations so that both systems of coordinates are referred from a common point.

Referring again to FIG. 1, the remote source rectangular coordinates $X_R$, $Y_R$, and $H_R$, are respectively applied as one input to respective difference modulators 28, 30, and 32. The local source rectangular coordinates $X_L$, $Y_L$, and $H_L$ are also respectively applied as the second input to respective difference modulators 28, 30, and 32. Each difference modulator comprises a differential amplifier to obtain D.C. voltage differences of the input coordinates and a modulator to convert the difference into an A.C. voltage. These modulator components are preferably of the electromechanical chopper type wherein the excitation voltage applied to the chopper coil is, as shown, the A.C. reference voltage derived from source 26. To obviate the necessity to correct for phase lag normally experienced in outputs of common choppers, zero phase-shift choppers are utilized, thus assuring phase coincidence between the A.C. output signal and the servo excitation. By such an arrangement each of the difference modulators 28, 30, and 32 produces a difference signal which is alternating in character and dependent upon the difference between the two input signals. Thus the difference modulators 28, 30, and 32 convert the voltage differences between the local and remote rectangular coordinates into properly phased A.C. error signals hereinafter designated as $\Delta X$, $\Delta Y$, and $\Delta H$. It is to be understood, of course, that other suitable and well known electronic type modulation components may be utilized in place of the chopper type.

The $\Delta X$ and $\Delta Y$ error signals are applied to respective stators of a resolver 34 through respective amplifiers 36 and 38. Resolver 34 includes two stator windings which produce fields perpendicular to each other and two similar rotor windings used to transform the rectangular coordinates $\Delta X$ and $\Delta Y$ error signals to voltages corresponding to polar coordinates representing range error and azimuth error signals, respectively, as explained below. The amplitude of the outputs from amplifiers 36 and 38 is controlled by an AGC circuit 40 responsive to both the $\Delta X$ and $\Delta Y$ error signals and the output of which controls the position of relay contact arms 42, 44, and 46. Contact arm 44 normally shorts out resistor 50 which is in the input circuit of amplifier 36 and contact arm 46 normally shorts out resistor 52 which is in the input circuit of amplifier 38. Contact arm 42 is normally in the open position as shown in the drawing. For large amplitude signals of $\Delta X$ and/or $\Delta Y$, the AGC output energizes a relay (not shown) which simultaneously actuates the contact arms 44 and 46 so that the resistors 50 and 52 are no longer shorted out. Under this condition, the resistors 50 and 52 comprise respective attenuation networks into the inputs of amplifiers 36 and 38. With the resistors thus in the input circuits of amplifiers 36 and 38, the overload of these amplifiers is prevented when the $\Delta X$ and/or $\Delta Y$ error voltages exceed a predetermined value. Simultaneously, contact arm 42 is actuated, thereby completing the circuit for the range slew drive motor of the local target track radar as will be explained below.

The amplified $\Delta X$ error signal is applied to one stator of resolver 34 while the amplified $\Delta Y$ error signal is applied to the other stator of resolver 34. The rotor of resolver 34, comprising two orthogonally positioned coils, is mechanically linked to the azimuth synchro drive system which controls the azimuth position of the local target track radar antenna. This mechanical linkage is shown by the dashed line 56. As is well known, each of the resolver rotor coils delivers an A.C. voltage output. One of these outputs represents the ground range difference, $\Delta R$, between local and remote data while the other output represents the azimuth angle difference, $\Delta \theta$, between local and remote data. The ground range difference $\Delta R$ is applied to the range servo unit 14 of target track radar 12 where it is utilized as an error signal. Similarly, the azimuth angle difference $\Delta \theta$ is applied to the azimuth servo loop 16 of target track radar 12 as an error signal. The range potentiometer 20 and azimuth potentiometer 22 will accordingly be driven by the respective outputs of range servo loop 14 and azimuth servo loop 16 in the correct direction to null the error voltages between the local and remote X and Y coordinates.

The local radar range slew motor (not shown) has its circuit completed to ground through either contact arm 58 or contact arm 60, through contact arm 62 and contact arm 42. Contact arms 58 and 60 are normally open while contact arm 62 is normally closed. The movement of contact arm 62 is controlled by the output of a range inhibit circuit 64 which is responsive to the azimuth error signal $\Delta \theta$ derived from one rotor of resolver 34. Since the range error signal, $\Delta R$, will be a minimum when azimuth error signal $\Delta \theta$ is a maximum, range inhibit circuit 64 is arranged such that there is an output therefrom until the azimuth error signal $\Delta \theta$ has reached a prescribed minimum, at which time the range error signal, $\Delta R$, is small enough so that the range inhibit circuit 64 becomes inoperative. When range inhibit circuit 64 operates, contact arm 62 is actuated to open the circuit to ground, but when it is inoperative the contact arm 62 is in its normally closed position. The contact arms 58 and 60 are controlled by the outputs of respective coincidence circuits 66 and 68 which may comprise any of the electronic tube type coincidence stages well known in the art. The two inputs to each of the coincidence circuits 66 and 68 are the range error voltage $\Delta Y$ from one rotor of resolver 34, and a servo excitation voltage derived from source 26, the servo excitation voltage to one of the coincidence circuits being 180° out-of-phase with the excitation voltage applied to the other coincidence circuit. This is accomplished by means of a secondary winding of transformer 72. The coincidence circuits 66 and 68 are designed so that either contact arm 58 or contact arm 60 is actuated whenever the resolver range error $\Delta R$ exceeds a predetermined level. Depending on which of the two coincidence circuits the range error $\Delta R$ and the reference A.C. inputs are in phase (assuming an error exists), a relay in the plate circuit of that coincidence circuit is operated to actuate its associated contact arm so that power will be applied to the range slew motor. It can be seen that, due to the action of contact arm 42 actuated by the AGC circuit 40, the operation of the range slew motor is dependent on the output of the AGC circuit 40. Thus when there is no output from AGC circuit 40, the operation of either coincidence circuit has no effect on the range slew motor. Also, the coincidence circuits are so arranged that when the range error signal has decreased to a predetermined value, the bias in the circuit causes the associated relay to open, thus removing the ground connection. By such an arrangement, fast range slew motor action is provided when the $\Delta R$ error voltage exceeds a predetermined level, and below this predetermined level, the range system will be servo driven to the null position.

The $\Delta H$ error signal derived from modulator 32 is applied to the elevation servo loop 18 of local radar 12 through amplifier and output stage 70. The output of the drive motor of elevation servo loop 18 drives the error control potentiometer 24 to the null position.

Figure 2:
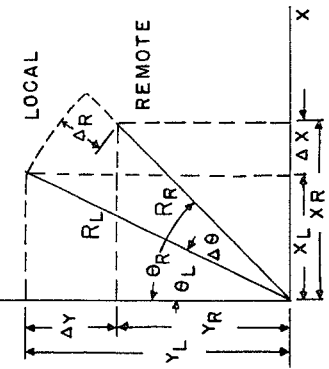
FIG. 2 is an exploratory diagram used in describing the operation of the invention.

For the sake of simplicity in describing the operation of the RPCS, it will be assumed that the local and remote H coordinate will be zero, and the X and Y data have such values as to allow them to be contained in the first quadrant. This is illustrated in FIGURE 2. From FIGURE 2 it will be noted that the local and remote data is designated $X_L$, $Y_L$ and $X_R$, $Y_R$ respectively, and, since elevation angle is assumed to be zero, the slant ranges $D_L$ and $D_R$ may be represented by respective ground ranges $R_L$ and $R_R$. The problem is to position the track radar in a direction to reduce the error angle $\Delta \theta$ to zero, and to a slant range equal to $R_R$. When this occurs, the rectangular position differences $\Delta X$ and $\Delta Y$ between the local and remote rectangular coordinates will be zero or nulled.

It should be noted that when the ground range difference $\Delta R$ has been reduced to zero, the slant range difference will of necessity also be reduced to zero. The X and Y local and remote data is fed into X and Y difference modulators 28 and 30 which obtain the position differences, or error signal voltages $\Delta X$ and $\Delta Y$, and transform them into properly phased A.C. voltages. The $\Delta H$ position difference is zero because, as was stated above, the remote and local H are zero.

The position difference voltages are fed via amplifiers 36 and 38 to the primary coils of resolver 34 and are transferred by the resolver primaries to the resolver secondary coils which constitute the resolver rotor coils. Each of the rotor coils in turn produce a respective A.C. voltage, one of which represents range difference $\Delta R$, between local and remote data while the other represents the azimuth angle difference $\Delta \theta$. These voltages are fed into their respective servo loops so that the outputs of the respective servo motors drive the radar antenna and also the range potentiometer 20. It is well to mention here that the polarity of the A.C. voltages is the primary factor for correct servo positioning, the magnitude of the voltages having no effect at all. The range and azimuth servos start to slew, or drive, in the proper direction. Referring to FIGURE 2, the local track radar drives to the right, increasing azimuth, while the range servo drives in a direction to decrease range. The range potentiometer 20, geared to the servo drive motor of the range servo loop, feeds a decreasing range voltage to the elevation potentiometer 22. In view of the assumption that the ground range and slant range are equal, this means that the decreasing range voltage is fed to the azimuth potentiometer which is geared to the servo drive motor of the azimuth servo loop, and drives in a direction to cause $Y_L$ to decrease and $X_L$ to increase (see FIGURE 2). After such a time when the inputs to the X and Y difference modulators become equal, the modulator outputs, $\Delta X$ and $\Delta Y$, and also the resolver output voltages become equal to zero. This causes the range and azimuth servos to cease slewing.

The action described above is really a continuous nulling process because the remote data, considering a moving target, is always changing. In reference to height, local and remote were considered to be zero in the preceding description. Actually, this is not true because the remote data will always have some value of H, while the H from the local data source can be any value depending upon the static position of the local target track radar antenna in elevation immediately upon the start of the local target track radar positioning. It will be observed from FIGURE 1, that $\Delta H$, which represents the position difference between local and remote heights, is fed from the $\Delta H$ difference modulator directly into the elevation servo loop. Depending upon the phase of the $\Delta H$ voltage from the modulator, the elevation servo and associated elevation potentiometer drives in either an up or down direction. Movement of the elevation potentiometer causes three operations to be performed: (1) the ground range is modified by the cosine of the elevation angle, (2) the H voltage is modified by the sine of the elevation angle, and (3) the modified ground range is fed to the azimuth potentiometer. Since the respective servo motors of the RPCS permits the azimuth, elevation, and range servos to drive in the correct direction, and subsequent simultaneous X, Y, and H computations occurring at the track radar, the $\Delta X$, $\Delta Y$, and $\Delta H$ from the output of the modulators will ultimately become zero. When this occurs, the track radar antenna and its range unit will be correctly positioned with respect to the remote rectangular coordinates.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination: a local target track radar including a range servo loop, an elevation servo loop, and an azimuth servo loop, each of said servo loops having respective servo drive output motors and including means respectively responsive to the respective outputs of said servo loop drive motors to produce three discrete D.C. voltages corresponding to $X_L$, $Y_L$, and $H_L$ rectangular coordinates of a point in space, a radar source remote from said target track radar and adapted to produce three discrete D.C. voltages which correspond to the $X_R$, $Y_R$, and $H_R$ rectangular coordinates of a target in space with respect to said radar remote source, said D.C. voltages being measured to the same scale and both sets of coordinates being referred to a predetermined common point, discrete means for converting the differences between corresponding rectangular coordinates to respective $\Delta X$, $\Delta Y$, and $\Delta H$ A.C. error signals, means for resolving said $\Delta X$ and said $\Delta Y$ A.C. error signals to respective voltages corresponding to polar coordinates representing range error and azimuth error signals, said range error signal voltage and said azimuth error signal voltage being applied respectively to said range servo loop and said azimuth servo loop, such that the output of said range and azimuth servo drive motors are driven in a direction to null the respective difference voltages applied thereto, and means for applying said $\Delta H$ error signal to said elevation servo loop whereby said elevation servo drive motor is driven in a direction to null said $\Delta H$ error signal.

2. In combination: a local target track radar including a range servo loop, an elevation servo loop, and an azimuth servo loop, each of said servo loops having respective servo drive output motors and including means respectively responsive to the respective outputs of said servo loop drive motors to produce three discrete D.C. voltages corresponding to $X_L$, $Y_L$ and $H_L$ rectangular coordinates of a point in space, a radar source remote from said target track radar and adapted to produce three discrete D.C. voltages which correspond to the $X_R$, $Y_R$ and $H_R$ rectangular coordinates of a target in space with respect to said radar remote source, said D.C. voltages being measured to the same scale and both sets of coordinates being referred to a predetermined common point, a first difference modulator responsive to corresponding $X_L$ and $X_R$ coordinates for producing a first A.C. error signal $\Delta X$ therebetween, a second difference modulator responsive to corresponding $Y_L$ and $Y_R$ coordinates for producing a second A.C. error signal $\Delta Y$ therebetween, a third difference modulator responsive to corresponding $H_L$ and $H_R$ coordinates for producing a third A.C. error signal $\Delta H$ therebetween, means for resolving said $\Delta X$ and $\Delta Y$ error signals to respective voltages corresponding to polar coordinates representing the range error and azimuth error signals, said range error signal voltage and said azimuth error signal voltage being applied to said range and said azimuth servo loops, respectively, such that the output of said range and azimuth servo drive motors are driven in a direction to null the respective differences in voltage applied thereto, and means for applying said $\Delta H$ error signal to said elevation servo loop whereby said elevation servo drive motor is driven in a direction to null said $\Delta H$ error signal.

3. In a local target track radar wherein the respective outputs of the elevation servo loop drive motor, the azimuth servo loop drive motor, and the range servo loop drive motor provide three distinct D.C. voltages which correspond to the $X_L$, $Y_L$ and $H_L$ rectangular coordinates of a point in space, means for causing said local radar to locate a target in space corresponding to $X_R$, $Y_R$ and $H_R$ rectangular coordinates derived from a remote radar source in the form of D.C. voltages, said D.C. voltages being measured to the same scale and both sets of coordinates being referred to a predetermined common point, said means comprising first, second and third difference modulators for respectively producing a first A.C. error signal corresponding to the difference between the voltage representing said $X_L$ and $X_R$ coordinates, a second A.C. error signal corresponding to the difference between the voltages representing said $X_R$ and $Y_R$ coordinates, and a third A.C. error signal corresponding to the difference between the voltages representing said $H_L$ and $H_R$ coordinates, a resolver responsive to the combined outputs of said first and second A.C. error signals for producing respective voltages corresponding to polar coordinates representing the range error and azimuth error signals, said range servo loop drive motor and said azimuth servo loop drive motor being responsive to said range error signal voltage and the azimuth error signal voltage such that the range and azimuth servo loop drive motors are driven in a direction to null the respective difference voltages applied thereto, and means for applying said third A.C. error signal to said elevation servo loop drive motor, whereby said elevation servo loop drive motor is driven in a direction to null said third A.C. error signal.

4. In combination: a local target track radar including a range servo loop, an elevation servo loop, and an azimuth servo loop, each of said servo loops having respective servo drive output motors and including means respectively responsive to the outputs of said servo loop drive motors to produce three discrete D.C. voltages which correspond to the $X_L$, $Y_L$ and $H_L$ rectangular coordinates of a point in space, a radar source remote from said track acquisition radar and adapted to produce three discrete D.C. voltages which correspond to the $X_R$, $Y_R$ and $H_R$ rectangular coordinates of a target in space with respect to said radar remote source, said D.C. voltages being measured to the same scale and both sets of coordinates being referred to a predetermined common point, a first difference modulator responsive to corresponding $X_L$ and $X_R$ coordinates for producing a first A.C. error signal $\Delta X$ therebetween, a second difference modulator responsive to corresponding $Y_L$ and $Y_R$ coordinates for producing a second A.C. error signal $\Delta Y$ therebetween, a third difference modulator responsive to corresponding $H_L$ and $H_R$ coordinates for producing a third A.C. error signal $\Delta H$ therebetween, a resolver circuit having two orthogonally positioned stator coils and two orthogonally positioned rotor coils, a first amplifier having its input respnsive to said first A.C. error signal and having its output applied to one resolver stator coil, a second amplifier having its input responsive to said second A.C. error signal and having its output applied to the other of said resolver stator coils, the output of one of said rotary resolver coils being applied to said range servo loop and the output of the other rotary resolver coil being applied to said azimuth servo loop, the respective outputs of said rotary coils producing voltages corresponding to polar coordinates representing the range error and azimuth error signals, said range servo loop and said azimuth servo loop being responsive to said range error signal voltage and the azimuth error signal voltage such that the range and azimuth servo loop drive motors are driven in a direction to null the respective difference voltages applied thereto, and means for applying said third A.C. error signal to said elevation servo loop whereby said elevation servo loop drive motor is driven in a direction to null said third A.C. error signal.

5. The combination called for in claim 4 and further including an AGC circuit having its input responsive to prescribed levels of said $\Delta X$ and $\Delta Y$ error signals, the output of said AGC circuit being adapted to control the amplitude of the $\Delta X$ and $\Delta Y$ error signals applied to said first and second amplifier, respectively.

References Cited
UNITED STATES PATENTS 2,776,424   1/1957   Lair et al.   343—7.3
3,218,640   11/1965   Kindle et al.   343—7

RODNEY D. BENNETT, *Primary Examiner.*

FREDERICK M. STRADER, CHESTER L. JUSTUS, *Examiners.*

M. A. MORRISON, R. M. SKOLNIK, T. H. TUBBESING, *Assistant Examiners.*